No. 798,307. PATENTED AUG. 29, 1905.
G. P. TAYLOR.
SHEARS.
APPLICATION FILED JAN. 7, 1905.
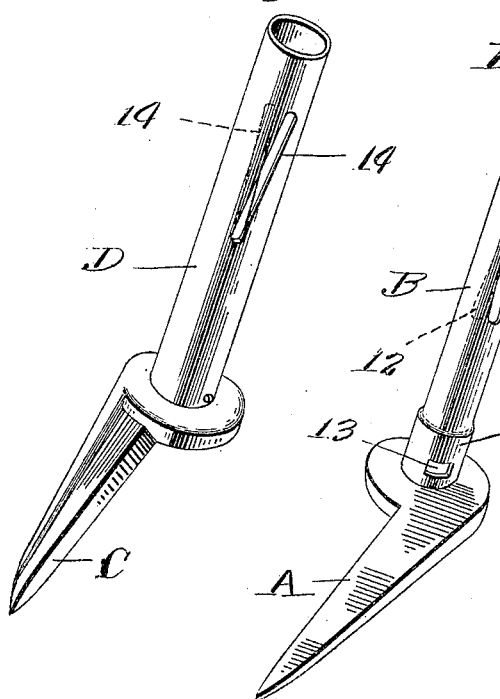
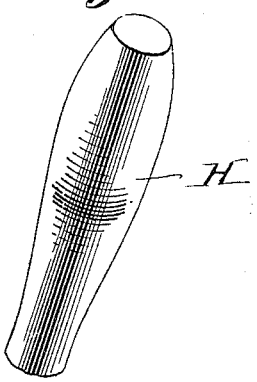
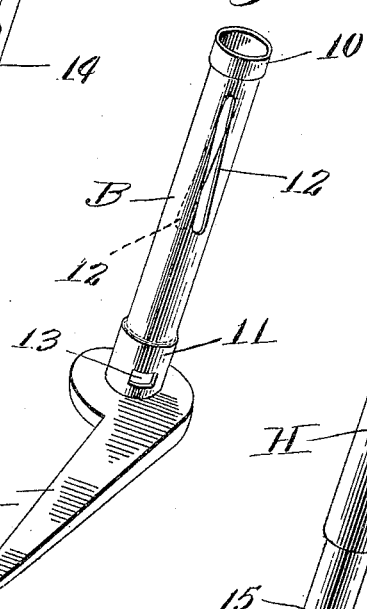
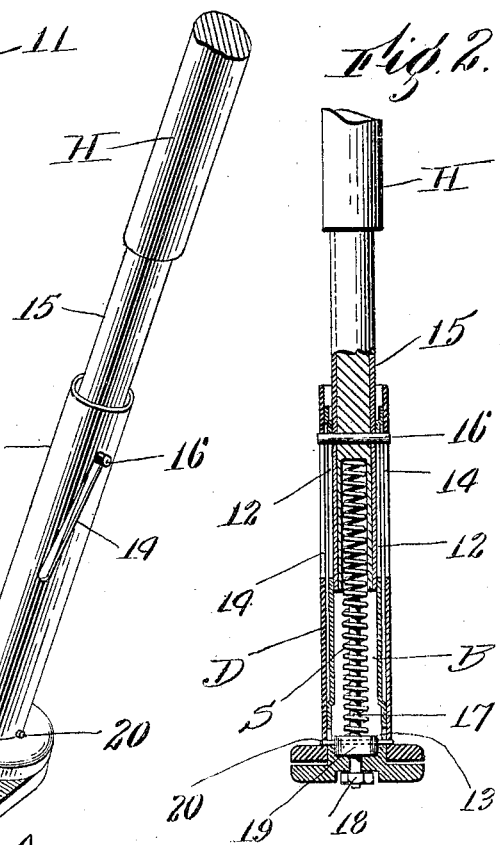
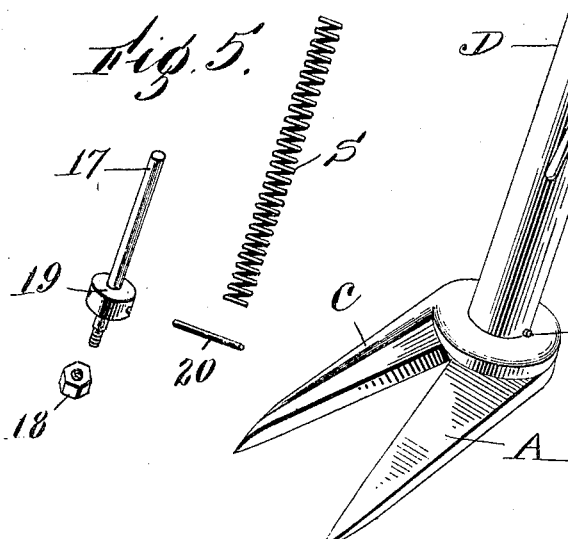
Witnesses:
C. F. Nixon
E. M. Allen
Inventor:
Geo. P. Taylor
By his Attorneys
Southgate & Southgate

UNITED STATES PATENT OFFICE.

GEORGE P. TAYLOR, OF CLINTON, MASSACHUSETTS.

SHEARS.

No. 793,307. Specification of Letters Patent. Patented Aug. 29, 1905.

Application filed January 7, 1905. Serial No. 240,002.

*To all whom it may concern:*

Be it known that I, GEORGE P. TAYLOR, a citizen of the United States, residing at Clinton, in the county of Worcester and State of Massachusetts, have invented a new and useful Shears, of which the following is a specification.

This invention relates to that class of cutters which are used in trimming the grass around the edges of lawns.

The especial object of this invention is to provide a pair of long-handled shears which can be used to trim the edge of a lawn while the operator is standing in an upright position and which may rest upon the ground during each cutting operation, the shear-blades being closed by downward pressure upon the handle while the heel is resting directly upon the ground.

To these ends this invention consists of the lawn-trimming shears as an article of manufacture and of the combinations of parts therein, as hereinafter described, and more particularly pointed out in the claims at the end of this specification.

In the accompanying drawings, Figure 1 is a perspective view of a pair of shears constructed according to this invention. Fig. 2 is a detail view thereof, partly in section. Fig. 3 is a perspective view of the upper blade and its tube. Fig. 4 is a perspective view of the lower blade and its tube, and Fig. 5 is a detail view of the spring and its accessories.

In keeping lawns and grass-plots in good condition the trimming of the grass around the edges requires the most labor. In order to do this, the grass is usually cut with hand-shears of the ordinary sheep-shear type. When this is done with the ordinary sheep-shears, the workman must assume a stooping position, frequently crawling on hands and knees. To overcome this objection, a number of long-handled shears have been devised, but in the use of such long-handled shears both hands are required to operate the shears, so that many gardeners still prefer to use the ordinary sheep-shears. As distinguished from the long-handled shears, a cutting implement constructed according to this invention is intended to rest its weight upon the ground, the cutter being first moved along to desired position and resting its weight upon the ground during each cutting operation of its blades, so that it can be operated by one or both hands.

In the specific form of construction shown herein a pair of shears constructed according to this invention comprises a pair of blades with an operating handle or rod extending at an angle therefrom, which handle has a connection to said shear-blades arranged so that when the handle is moved to and from the blades the same are operated. The operating connection is spiral and is preferably arranged so that both blades turn relatively to the handle when the handle is moved.

Referring to the drawings and in detail, A designates the lower blade, projecting up from which is a tube B, which is provided with ribs or bearing-sections 10 and 11, which may be formed by swaging out the metal. The tube B is provided with spiral grooves or slots 12 12 on opposite sides thereof. Holes 13 are cut through the tube near its lower end.

C designates the upper blade. Extending up from the upper blade is a tube or cylinder D of just the right size to have the tube B telescope into the same and to have the bearing-ribs 10 and 11 fit nicely therein. The tube D is provided with spiral grooves or slots 14 14, oppositely disposed relatively to the spiral grooves 12 12 on the tube B.

The blades A and C may have strengthening-ribs.

H designates the operating-handle. Fitting on the lower end of the same is a tube or bearing-piece 15. This tube 15 is of a diameter to fit easily into the tube B of the lower blade. A pin 16 is inserted through the spiral grooves 12 12 of the tube B, and the spiral grooves 14 14 of the tube D are driven tightly into the handle H.

A rod 17 is inserted through a hole in the lower blade A. The end of the rod is screw-threaded and a nut 18 may be run thereon. A spring S is placed on this rod 17 and extends up into a hole bored in the lower end of the operating-handle H. A collar 19 is placed inside of the tube B, and the rod 17 extends through this collar.

A pin 20 is driven through the outer tube D, through the holes 13 13 in the inner tube B, through the collar 19 and the rod 17. By this arrangement the collar 19 and rod 17 will turn with the outer tube D and the upper blade C.

To operate the device, the heel of the lower blade A is placed on the ground and the operating-handle is pushed down against the spring S and is allowed to come up by the pressure of the spring. This movement of the handle to and from the blades operates or turns the same toward and away from each other.

The grooves or slots 12 12 are preferably oppositely disposed relatively to the grooves or slots 14 14, so that as the handle is operated both blades will turn relatively to the operating-handle. This will give an easy and nice cutting motion.

Other forms of spiral connection besides slots may be employed and other modifications of the device may be made by a skilled mechanic without departing from the scope of my invention as expressed in the claims.

Having thus fully described my invention, what I claim, and desire to secure by Letters Patent, is—

1. A shears comprising blades, an operating-handle extending angularly therefrom, and spiral connections whereby the movement of the handle to and from the blades will cause a relative movement thereof.

2. A shears comprising blades, an operating-handle extending therefrom, and a spiral connection between the blades and handle, whereby a movement of the handle to and from the blades will operate the device.

3. A shears comprising blades, an operating-handle extending therefrom, and a spiral connection between both blades and the handle, whereby the movement of the handle to and from the blades will operate them both.

4. A shears comprising blades, an operating-handle extending therefrom, and a spiral connection between both blades and the handle arranged so that a movement of the handle to and from the blades will operate each blade relatively to the handle.

5. A shears comprising blades attached to telescoping tubes, and a handle having a spiral connection to operate the device.

6. A shears comprising blades attached to telescoping tubes, and a handle having a relatively opposite spiral connection to each tube.

7. A shears comprising blades attached to telescoping tubes, a handle fitting the inner tube and having a spiral connection to operate the shears, and a spring to return the handle and open the device.

8. A shears comprising blades attached to telescoping tubes, one of the tubes having bearings, and a handle fitting in the inner tube and having a spiral connection to operate the device.

9. A shears comprising blades attached to telescoping tubes, a handle fitting in the inner tube, oppositely-disposed spiral grooves cut in said tubes, and a pin driven into said handle and coöperating with the spiral grooves.

10. A shears comprising blades attached to telescoping tubes, a handle fitting in the inner tube and having a spiral connection to operate the shears, a rod secured to the lower blade, and a spiral spring arranged on said rod to press against the handle.

11. A shears comprising blades attached to telescoping tubes, a handle fitting in the inner tube and having a spiral connection to operate the device, a rod fitted in the lower blade and carrying a spiral spring bearing on the handle, connections whereby said rod will turn with the upper blade, and a nut for holding the blades from separating.

12. A shears comprising blades attached to telescoping tubes, a handle fitted to said tubes and having a spiral connection to operate the device, a collar fitted in the inner tube, a rod extending through the lower blade and through said collar and carrying a spring bearing on said handle, and a pin driven through the outer tube, said collar and said rod, the inner tube having holes to allow the relative rotation of the tubes.

In testimony whereof I have hereunto set my hand in the presence of two subscribing witnesses.

GEORGE P. TAYLOR.

Witnesses:
E. M. ALLEN,
LOUIS W. SOUTHGATE.